No. 811,799. PATENTED FEB. 6, 1906.
O. SEIDEMANN.
BELT SHIFTING FOR SPEED CONES.
APPLICATION FILED JULY 24, 1905.

Witnesses
Paul Krüger
Fritz Sander

Inventor,
Otto Seidemann

UNITED STATES PATENT OFFICE.

OTTO SEIDEMANN, OF JENA, GERMANY, ASSIGNOR TO THE FIRM OF CARL ZEISS, OF JENA, GERMANY.

BELT-SHIFTING FOR SPEED-CONES.

No. 811,799. Specification of Letters Patent. Patented Feb. 6, 1906.

Application filed July 24, 1905. Serial No. 270,979.

*To all whom it may concern:*

Be it known that I, OTTO SEIDEMANN, mechanician, a citizen of the German Empire, residing at Carl Zeiss strasse, Jena, in the Grand Duchy of Saxe-Weimar, Germany, have invented a new and useful Belt-Shifting for Speed-Cones, of which the following is a specification.

The invention relates to belt-shifting appliances for speed-cones. It solves the problem of guiding the belt, which has been brought upon the next step lower of the one cone by a self-acting device upon the corresponding step higher of the other cone without connecting both belt-fork carriers—that one at the one cone and that one at the other. Each belt-fork carrier is loaded by a weight or spring in the sense that its fork presses the belt so long until it is situated upon the highest step laterally against the rise of the next higher step. If, therefore, by shifting the fork-carrier at the one cone counter to the load of the weight or spring the belt be guided upon the next lower step of this cone, the belt becomes slack and is forced upon the next higher step of the other cone by the weight or spring impulse of the loaded fork-carrier. It must be admitted that the simplicity and the corresponding certainty of action of the new mechanical appliance is accompanied by a slight increase in the waste power of the belting. This new self-acting device can also be applied to the driving-cone only, leaving the operative to shift the belt on the driven cone by hand. In this sense the annexed examples are restricted to a driving-cone. With the driven speed-cone accessible to the operative the device, if such be applied, is still more simple, in so far that the handle can be immediately connected to the fork-carrier.

Figure 1:
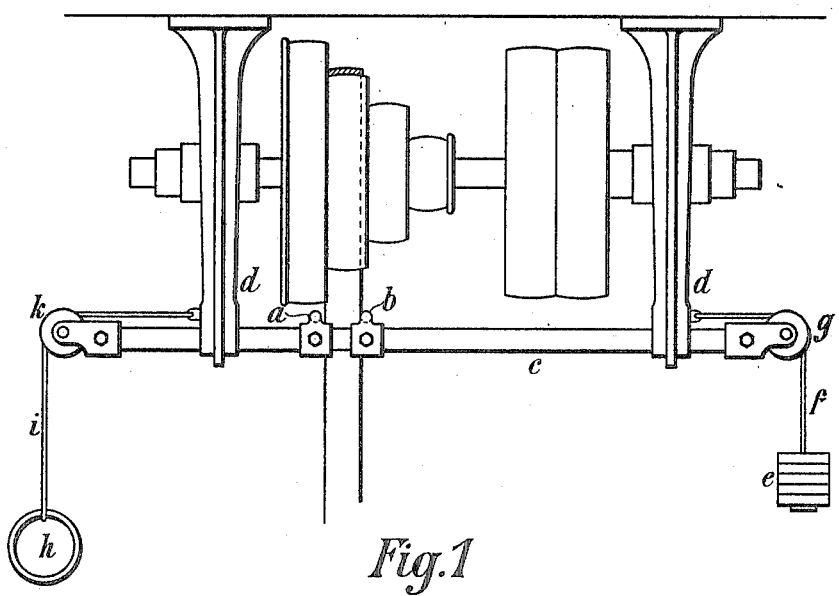
Figure 2:
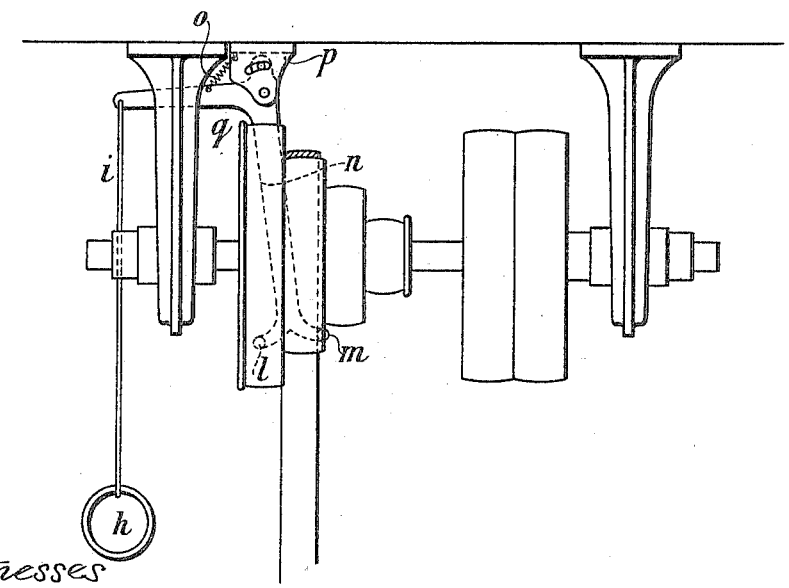

In the annexed drawings, Figure 1 is a front elevation of a belt-shifting appliance constructed according to the invention. Fig. 2 is a similar view of a modified belt-shifting appliance also constructed according to the invention.

In the arrangement according to Fig. 1 the carrier of the belt-fork *a b* is a sliding bar *c*, borne by the elongated hanging brackets *d*, the fork surrounding the belt from within. The force of a weight *e* is transmitted by a cord *f* and a pulley *g* to the sliding bar, so as to load it in a sense to lead the belt over to a higher step. In the drawings the pulley *g* is borne on the sliding bar *c* and the cord fastened to the immovable body *d*. The same arrangement has been chosen for the ring *h*, with the cord *i* and the pulley *k*, by means of which the operative brings the belt upon a lower step of the driving-cone.

In the modified arrangement according to Fig. 2 the belt-fork *l m* is situated at the end of a suspended lever *n* and surrounds the belt from the outside. The belt-fork carrier *n* is in this case loaded by a helical spring *o*, one end of which is fastened to a second arm *q* of the lever *n* and the other to the bracket *p*. In order to bring about the shifting of the belt in a direction opposite to that in which the self-acting device operates, a ring *h* is suspended from the arm *q* by the cord *i*.

What I claim as my invention, and desire to secure by Letters Patent, is—

In a belt-shifting appliance for speed-cones the combination, with the movable carrier of the belt-fork, of a self-acting device, permanently tending to move the carrier in the direction toward the next higher step against the resistance of the belt tightened on its actual step, and of means for moving the carrier in the direction toward the next lower step against the power of the self-acting device.

In testimony whereof I have signed my name to this specification in the presence of two subscribing witnesses.

OTTO SEIDEMANN.

Witnesses:
  PAUL KRUGER,
  FRITZ SANDER.